Oct. 13, 1953

J. R. ALMOND 2,655,042

GEAR SHIFTING MECHANISM

Filed July 3, 1944

INVENTOR.
JOHN R. ALMOND,
BY
ATTORNEY.

Oct. 13, 1953 — J. R. ALMOND — 2,655,042

GEAR SHIFTING MECHANISM

Filed July 3, 1944 — 3 Sheets-Sheet 2

INVENTOR.
JOHN R. ALMOND.
BY *Louis W. Kelmuth*
ATTORNEY.

Oct. 13, 1953 J. R. ALMOND 2,655,042
GEAR SHIFTING MECHANISM
Filed July 3, 1944 3 Sheets-Sheet 3
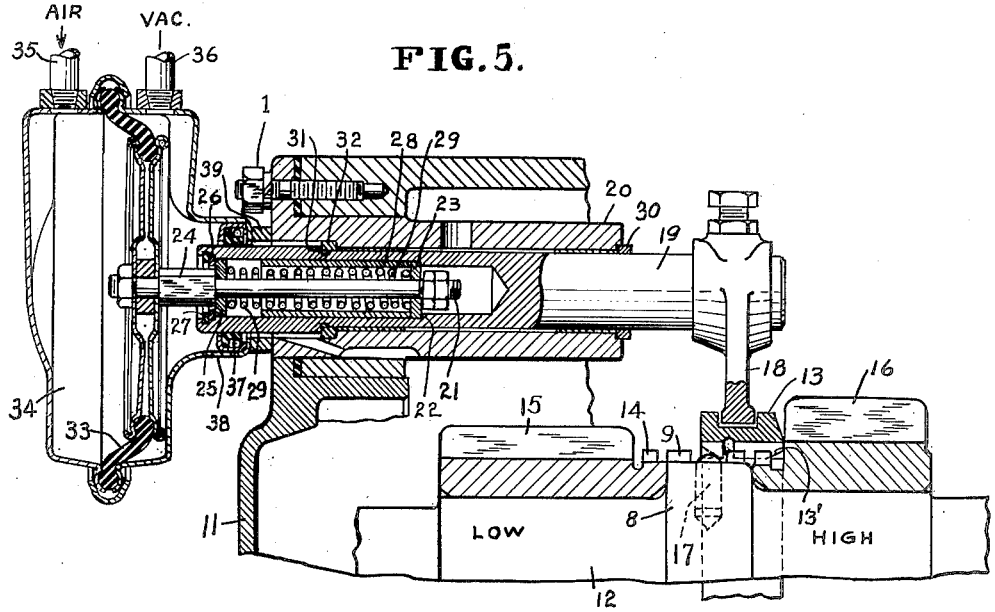
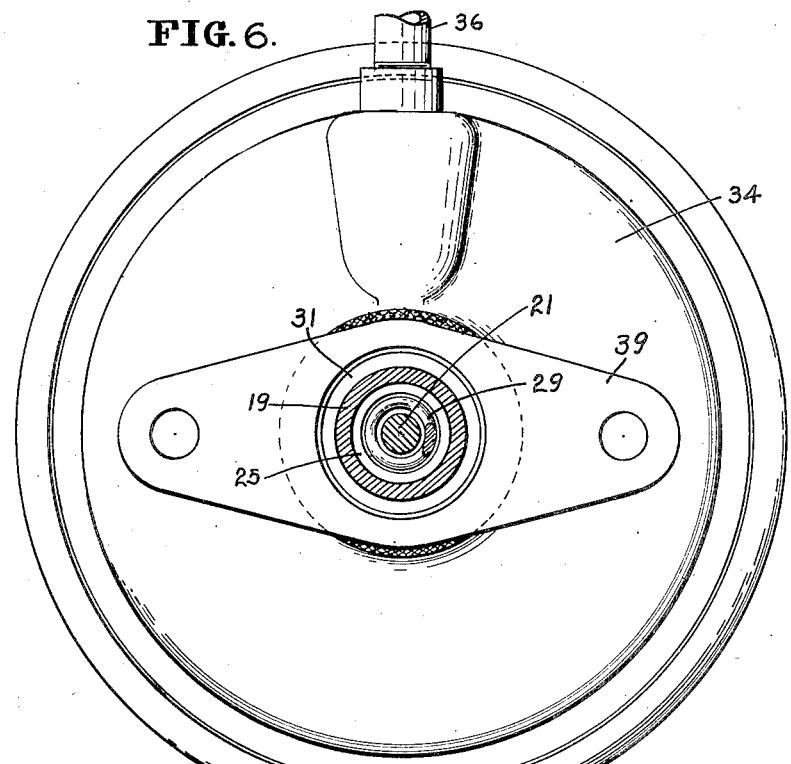
INVENTOR.
JOHN R. ALMOND.
BY
ATTORNEY.

Patented Oct. 13, 1953

2,655,042

UNITED STATES PATENT OFFICE 2,655,042

GEAR SHIFTING MECHANISM

John R. Almond, Cleveland, Ohio, assignor to The Midland Steel Products Company, Cleveland, Ohio, a corporation of Ohio Application July 3, 1944, Serial No. 543,299

10 Claims. (Cl. 74—335)

1

This invention relates to new and useful improvements in gear shifting mechanism for two speed rear axle transmissions of automotive vehicles and an important object thereof is to provide two axle gear ratios for every transmission speed, without requiring manual effort, whereby drivers can more readily take advantage of the increased performance possibilities of a two speed axle and operate their trucks to carry capacity loads while maintaining top road speeds with efficient gear ratios.

Another important object of the invention is to provide a power shifter of this type with which shock loading of the axle transmission gears is minimized whenever an axle ratio is changed.

A further object of the invention is to provide a power shifter mechanism with which shifts are automatically completed as soon as the driver releases the foot throttle momentarily, and which shifts as easily in split gears under hard pulls as in the shifting of the ordinary transmission ratio.

A still further object is to provide a double acting fluid power shifter to place two speed axle gears in position ready for mesh and in which a single spring is employed to cause the final complete mesh of the gears when synchronized.

Another object is to provide a double acting fluid pressure power piston in conjunction with a spring normally at rest and which is loaded by piston movement in either direction to store energy for independently operating the shifter rod in its final stage of movement to mesh the gears.

Other objects and advantages will become apparent during the course of the following description.

In the accompanying drawings forming a part of the specification and wherein like numerals are employed to designate like parts throughout the several views.

Figs. 3, 4 and 5 are similar views with the shifter device in initial, mid-shift and fully shifted positions respectively, showing the phases in the operation of pre-selected low speed to high speed axle gear ratio, and Fig. 6 is an enlarged transverse section taken on the line 6—6 of Fig. 2.

Figure 1:
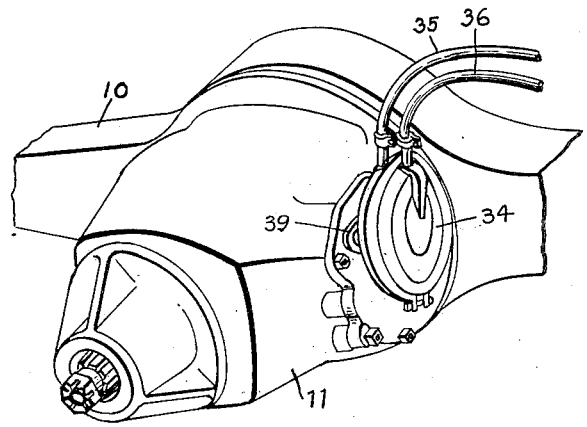
Fig. 1 is a perspective view of a differential housing with two speed axle gearing and my invention applied thereto.

Referring to the drawings in detail and more particularly to Fig. 1, the numeral 10 designates a rear axle housing of a truck, to the forward face

2 of which is attached a two-speed axle transmission case 11 containing gearing for changing the gear ratio of rear axle shafts extending through the housing in the usual manner. Within this case is mounted a drive shaft 12 having an enlarged central portion 8 with clutch teeth 9 on which a clutch ring or shifter gear 13 is splined to mesh with the clutch teeth 14 of either low speed or high speed gears 15 and 16 mounted to rotate freely on the reduced portions of the shaft 12. A spring pressed detent or clutch lock 17 is mounted radially in the center of the enlarged portion 8 of drive shaft 12 to resiliently engage the inclined ends 13' of the spline teeth on the inner periphery of the clutch ring to normally hold the sides of the groove in the shifter ring in spaced relation to the shifter fork 18 to reduce wear. It will be understood that the high speed and low speed gears 15 and 16 are in constant mesh with differential gearing not shown, to effect different gear ratios of the axle shafts, not shown, but well understood by those in the art.

The shifter fork 18 is keyed to the end of the shifter rod 19 which is longitudinally slidable in a bearing sleeve 20 extending into one side of the housing 11 and secured thereto by screws 1. The outer end of the rod 19 which extends outside of the housing, is hollow for a depth to accommodate the piston rod 21 and to permit a limited degree of longitudinal movement thereof. The inner end of the bore in the rod is reduced to provide an annular shoulder 22 against which a head or washer 23, slidably mounted on the piston rod and in said bore, normally abuts when the clutch ring 13 is meshed with the low speed gear 15.

The piston rod 21 has an enlarged hex portion 24, forming a shoulder which engages a second head or washer 25 slidable inwardly on the piston rod and in the hollow shifter rod 19, and is limited in its outward movement by abutment with a stop ring 26 retained in position with a snap ring 27 at the free end of the shifter rod. Slidably mounted in the bore of the shifter rod 19 is a spring-load-limiting sleeve 28 having limited reciprocal movement by abutment either with washer 25 or 23, depending upon the direction of movement of the piston rod. A coiled spring 29 encircles the piston rod 21 between the washers 25 and 23 and is compressed between them as the rod 21 moves in either direction, sliding through one washer to be compressed against the other washer held by its abutment with either the shoulder 22 or the stop ring 26. Thus, the piston rod 21 has limited longitudinal sliding movement in either direction in the shifter rod 19 to gradually compress the spring while moving the shifter rod, until the spring is loaded or compressed 50 or 60 pounds, or to the desired extent determined by both washers abutting the limiting sleeve 28, after which the spring takes over to move the shifter rod 19 in the same direction with a cushioned force thereby preventing the clash of gears as the shifter ring 13 moves its teeth into mesh with those of either independently rotatable high or low gear 15 or 16.

Figure 2:
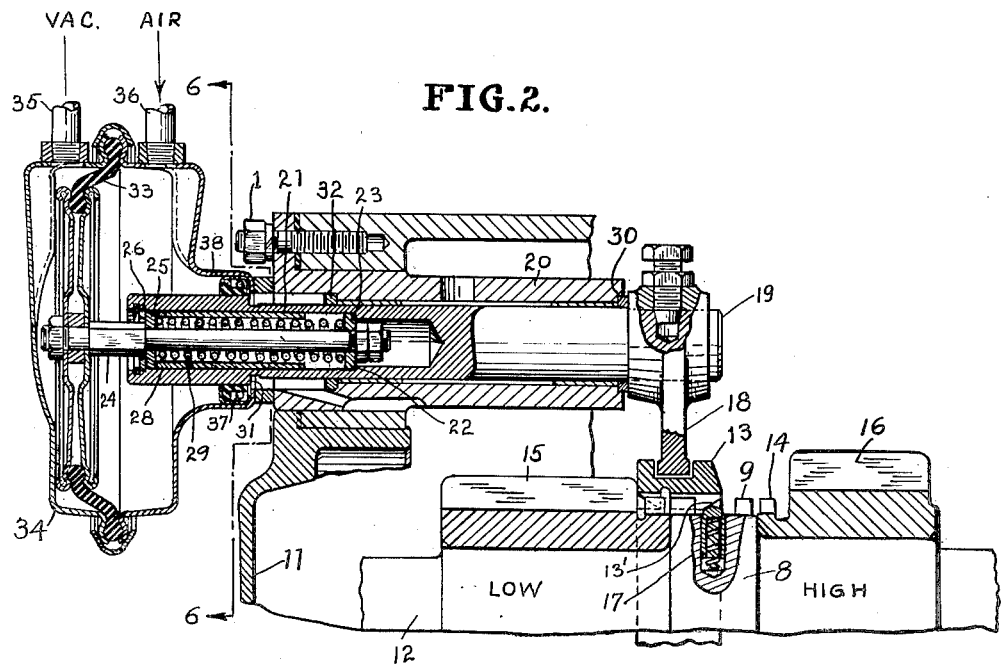
Fig. 2 is a longitudinal section through a portion of a two-speed axle transmission with the parts in position to effect a low speed gear ratio with my shifter applied thereto.

The hub of shifter fork 18 finds abutment against the end of bearing sleeve 20 or a ring 30 to limit the retractile movement of the shifter rod 19 whereby it cooperates with the shift lock 17 in holding the fork 18 in a low speed position shown in Fig. 2 with clearance with respect to the groove in the shifter ring to reduce wear. Movement of the shifter rod 19 in the opposite direction is checked by a shoulder 31 of the rod abutting the ring or shoulder 32 provided in the bore of sleeve 20 to centralize the fork 18 in the groove of clutch ring 13 as shown in Fig. 5 when the fork 18 is in a high speed position.

The piston rod 21 is activated by a double acting diaphragm 33 supported in a chamber 34 having conduits 35 and 36 communicating with the chamber on opposite sides of the diaphragm whereby atmospheric air pressure or a pressure lower than atmospheric can be directed to either side of the diaphragm from a pre-selector valve (not shown) preferably located on the instrument panel of the vehicle. This valve may be of any type which is connected to a source of partial vacuum, such as the intake manifold of an internal combustion engine, and with the atmosphere so as to open either pressure to either side of the diaphragm through the pipes 35 and 36. This valve has two positions, high speed and low speed, to effect high and low gear ratios of the two speed axle transmission gearing. The casing 34 of the chamber is formed with a neck portion carrying an oil and dust seal 37, through which the end of the shifted rod 19 projects into the casing 34. This neck portion is welded to a bracket 39 which bolts the diaphragm casing to the two speed transmission case 11 as shown in Fig. 1. The piston stem 21 moves the shifter rod 19 in either direction by means of spring 29 and sleeve 28 having limited movement between the washers 23 and 25.

Figure 3:
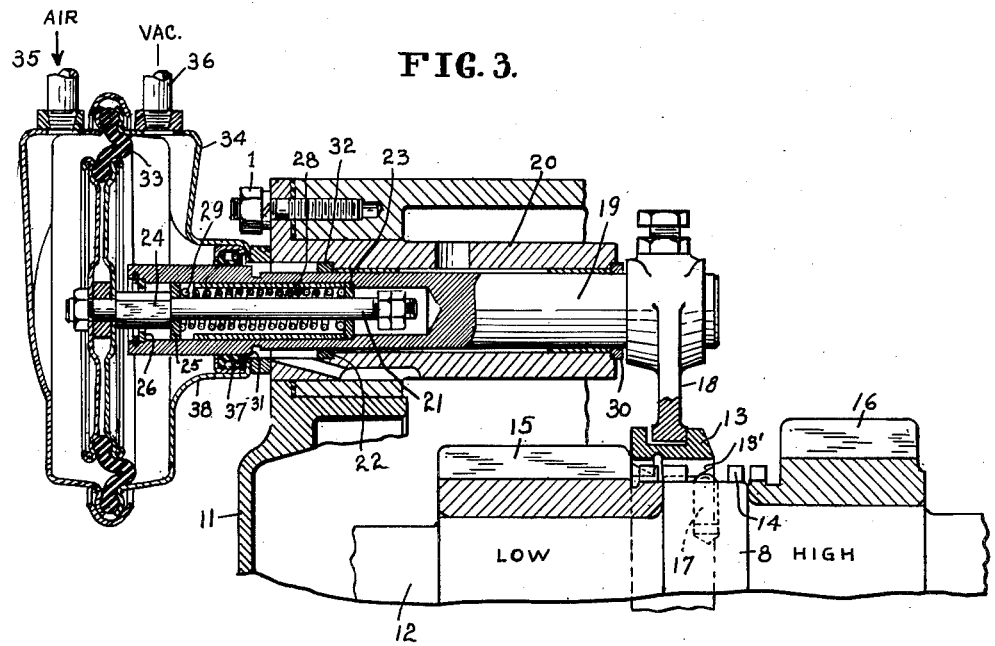
Figure 4:
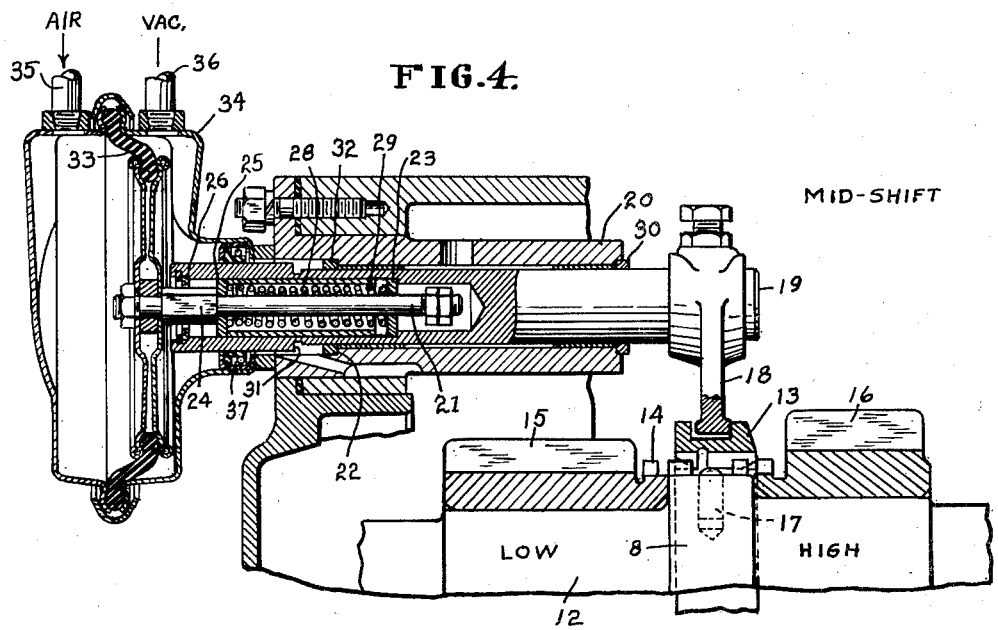

The operation of the device is as follows:

Assuming that the automotive vehicle to which the two speed axle transmission is applied, is traveling at the speed selected by the driver, through the usual transmission gearing; the two speed axle transmission may be placed in low axle speed as shown in Fig. 2, or in high axle speed as shown in Fig. 5. As shown in Fig. 2, the shaft 12 is driving low speed gear 15 through the clutch ring 13 being positioned as shown therein with its teeth or splines 13' meshed with the teeth 9 and 14. The axle gears continue locked in low speed position as long as the driving torque is uninterrupted and the position of the selector valve is unchanged. Assuming that this valve is or has been shifted to obtain a higher axle speed ratio, sub-atmospheric pressure is created through pipe 36 on the right hand side of the diaphragm 33 while atmospheric pressure is admitted on the left hand side of the diaphragm. This differential pressure moves the diaphragm toward the right as shown in Fig. 3 to move the hex portion 24 of the shifter rod to the right carrying the washer 25 and limiting sleeve 28 with it to the right, thereby partially compressing the spring 29. Continued movement of the diaphragm to the limit of its movement to the right, moves the shifter rod 19 to the right and further compresses spring 29 to the limit set by the limiting sleeve 28 so as to move the clutch ring 13 to a neutral position ready to engage its teeth 13' into mesh with the teeth of high gear 16 as shown in Fig. 4.

The axle shift is now in position ready to shift the two speed axle gears into high speed ratio. When the operator releases the accelerator momentarily to interrupt the driving torque, the gears will be synchronized, at which time, the force stored by spring 29 will be expended to move the shifter fork farther to the right to engage the clutch ring 13 with the teeth 14 of high speed gear 16 and cause final mesh of the gears. To shift from low to high speed axle ratio, release of the accelerator followed by a pause and then down on the accelerator enables the truck to maintain road speed during a shift. When shifting from high speed to low speed, the accelerator pedal is simply released and then pressed down without any pause. The shift lock 17 then moves the ring slightly farther to the right centering it with the shifter fork to avoid wear as shown in Fig. 5. The shifter spring 29 having thus expended its stored power to cause the resilient final engagement of the gears without clashing, there is no working load on this spring and the parts remain in their respective positions until the pre-selector valve has again been manipulated to shift into low speed axle ratio by admitting atmospheric pressure on the right hand side of the diaphragm, and the reverse operations take place, causing first, the power piston to move the clutch ring to compress the shifter spring ready to act in causing final mesh of the teeth of the clutch ring with the teeth 14 of low gear 15, when pressure on the accelerator has been momentarily released to synchronize the gears. Thus, the device enables the driver to use either low speed or high speed axle ratio at will in any of the usual transmission ratios, without manual axle shifting, declutching and loss of headway. It will also be seen that the initial power for shifting the axle ratios is furnished by the vacuum power chamber; the final sliding of the clutch ring 13 into mesh into low or high speed axle gears being accomplished solely by the power from the single spring 29. Because the axle ratio is pre-selected or pre-arranged by the selector valve, dumping atmospheric pressure on the desired side of the diaphragm, the axle shift is automatic from that point on, and relieves the driver from manual shifting of axle ratio, whereby transmission ratios may be changed at will, with axle shifts following through automatically when the driver operates the accelerator in a manner causing approximate synchronization of the gears to be meshed. Since this enables all drivers to simultaneously shift gears with both transmission and axle gears, without shifting the regular clutch, all gear ratios of the two transmissions can be conveniently utilized to their fullest extent.

It will be understood that various changes in the size, shape and relationship of parts may be resorted to without departing from the scope of the appended claims.

I claim:

1. The combination with a dual-ratio change-speed transmission gear mechanism effected by motor acceleration and including a change-speed gear shifter to effect different gear ratios, of a power shifter mechanism including a shifter rod to move a clutch to a position ready for mesh with a selected transmission gear of said mechanism, a double acting fluid pressure element having a stem slidably mounted in said rod, a spring interposed between said stem and rod by which the latter is yieldingly moved by said stem, a sleeve limiting the compression of said spring by said stem whereby the stem and rod can move as a unit under the influence of said power mechanism to place said clutch in the aforesaid position, and said spring acting to move the shifter rod farther in the same direction to cause final complete mesh of the selected transmission gears as they become substantially synchronized by deceleration.

2. The combination with a dual-ratio change-speed transmission gear mechanism effected by motor acceleration and including a change speed gear shifter to effect different gear ratios, of a power build up shifter mechanism including a shifter rod to move a clutch to a position ready for mesh with a selected transmission gear of said mechanism, said rod having a bore therein with spaced abutments, a sleeve slidable in said bore between said abutments, a single spring operating between said abutments, a double acting fluid pressure element having a stem slidably mounted in said bore and having spaced members confining said spring and slidably mounted in said bore and upon said rod to cooperate with said abutments in limiting the loading of said spring, said double acting fluid pressure element acting to positively move said clutch to a position ready for mesh with a selected transmission gear of said mechanism, and said spring acting to further move the clutch to cause final mesh of the selected transmission gears when they are substantially synchronized.

3. The combination with a dual-ratio change-speed transmission gear mechanism effected by motor acceleration and including a change speed gear shifter to effect different gear ratios, of a power shifter mechanism including a shifter rod to move a clutch to a position ready for mesh with a selected transmission gear of said mechanism, a bearing sleeve having a pair of spaced abutments, a shifter rod having a shoulder to cooperate with one of said abutments to limit the outward movement of said rod, a shifter fork on said rod and serving to abut the other abutment to limit the inward movement of said rod, a drive shaft having an enlarged portion with loosely mounted gears on opposite sides thereof, said enlarged portion of said shaft and gears having clutch teeth thereon, said clutch co-operating with the enlarged portion of the shaft and either gear to clutch the latter to said clutch, said abutments of the bearing sleeve and shifter rod serving to locate the shifter fork with respect to said clutch to reduce wear, a double acting fluid pressure element having a stem slidably mounted in said shifter rod and provided with spaced abutments and cooperating slidable members, a single spring interposed between said stem and rod and between said slidable members by which the rod is moved by said stem, and said spring acting to further move the shifter rod to cause final mesh of the selected transmission gears.

4. The combination with a dual ratio change speed transmission gear mechanism effected by motor acceleration and including a shifter mechanism comprising a reciprocable shifter rod, a clutch and a pair of transmission gears at opposite sides of said clutch, said rod having a pair of spaced internal abutments, a double acting fluid pressure operated element having a stem with a pair of fixed abutments operating in said rod, a pair of spaced washers slidably mounted upon said stem, a coiled spring mounted upon said stem between said washers, and a sleeve slidably mounted in said rod between said washers and adapted to be engaged by one of said washers being moved by one of said fixed abutments of said stem to compress said spring in either direction of movement and to abut one of said internal abutments to move said rod and clutch to a ready to engage or disengage position until motor acceleration is changed, said spring being thereby released to become the sole activating force to complete a second stage movement and the engagement or disengagement of said gear mechanism as it becomes synchronized by a change of motor acceleration.

5. In an automotive vehicle provided with an internal combustion engine having an accelerator for in part controlling the operation of said engine, a two speed rear axle gear mechanism including a clutch, shifter fork and rotatable members, a reciprocable shifter rod for moving said fork and clutch for meshing and de-meshing said members, power means for moving said rod comprising a motor and a stem operated thereby to move said rod in one or the other of two directions to ready the axle mechanism in either one or the other of its two settings, said rod having a single spring enclosed therein, said motor when energized serving to operate said spring to move said rod and clutch to move the two speed gear mechanism toward one of its two settings and to compress said spring, said spring when expanding serving to further move the clutch and axle mechanism in the same direction to establish the mechanism in one of its two settings as said engine is controlled to cause said members of said gear mechanism to be substantially synchronized.

6. The combination with a motor, accelerator and a dual ratio change speed transmission gear mechanism effected by motor acceleration and including a shifter mechanism comprising a reciprocable shifter rod, a clutch and a pair of transmission gears at opposite sides of said clutch, said rod having a pair of spaced internal abutments, a double acting fluid pressure operated element having a stem operating in said rod to cooperate with said abutments, and a coil spring mounted upon said stem within said rod and adapted to be compressed in either direction of a power movement of said stem to telescope the rod and stem while moving the rod in a given direction to a position determined by one of said abutments to thereby move said clutch to a ready to engage or disengage position until motor acceleration is changed at which time the clutch and one gear are substantially synchronized whereby the energy of said spring can be released to become the sole activating force to complete the engagement or disengagement of said clutch and gear.

7. The combination with a dual ratio change speed transmission gear effected by motor acceleration and including a clutch and a pair of transmission gears on opposite sides thereof, a reciprocable shifter rod having a fork for operating in a groove of said clutch to move the same in either of two directions for engaging and disengaging said clutch with either of said gears, a spring mechanism enclosed in said rod, power means for moving said rod in either direction to ready the change speed transmission in either one of its two gear settings and to compress said spring mechanism until said motor speed has been altered to enable said spring mechanism to expand and to further move the fork against the side of the clutch groove in the same direction to engage or disengage the speed transmission in one of its settings, and means for subsequently moving said clutch whereby the sides of said clutch groove are free of said fork to relieve friction between said clutch and fork.

8. The combination with a dual ratio change speed transmission gear effected by motor acceleration and including a clutch ring and a pair of transmission gears on opposite sides thereof, said clutch ring having an annular groove and internal clutch teeth with beveled ends, a reciprocable shifter rod having a fork for operating in a groove of said clutch to move the same in either of two directions for engaging and disengaging said clutch with either of said gears, a spring mechanism enclosed in said rod, power means for moving said rod in either direction to ready the change speed mechanism in either one of its two gear settings and to compress said spring mechanism until said motor speed has been altered to enable said spring mechanism to expand and to further move the fork against the side of the clutch groove in the same direction to engage or disengage the speed mechanism in one of its settings, and a spring pressed detent engageable with either beveled end of the clutch teeth to cooperate in moving said clutch whereby the sides of said clutch groove are free of said fork after complete engagement of the clutch and selected gear.

9. In an automotive vehicle provided with an internal combustion engine having an accelerator for in part controlling the operation of said engine, a two speed rear axle gear mechanism including a clutch and rotatable gears, a hollow reciprocable shifter rod for moving said clutch for meshing and de-meshing said gears, power means for moving said rod comprising a differential air operated motor and a piston stem operated thereby in either direction and operating within said rod, said rod having a pair of spaced internal abutments, said stem having a pair of fixed abutments and a pair of slidably mounted washers, a coil spring mounted upon said stem between said washers, and a sleeve slidably mounted in said rod between said washers and adapted to be engaged by one of said washers being moved by one of said fixed abutments of said stem to compress said spring in either direction of movement and to abut one of said internal abutments to move said rod and clutch to a ready to engage or disengage position until said accelerator is operated to alter the engine speed, said spring being thereby released to become the sole activating force to complete engagement or disengagement of said gear mechanism as the clutch and gear become substantially synchronized by said accelerator operation.

10. A two speed rear axle mechanism comprising a housing containing a clutch, a shifter member, and rotatable members, an actuator mounted on said housing for moving said shifter member and clutch for meshing and de-meshing said rotatable members, said actuator comprising a fluid motor including a piston element, a pair of relatively slidable rods extending through said housing, one of said rods being hollow to receive the other rod, axially spaced fixed shoulders on both rods, axially spaced washers slidable relative to both rods each washer being normally in engagement with a pair of said shoulders, a single spring surrounding the inner rod and pressing said washers against the respective shoulders for firmly holding said rods in a neutral position, relative motion of said rods in either direction from said neutral position serving to compress said spring, rod stop means engageable to limit compression of said spring means in both directions with said stop means thereafter effecting a solid connection between said rods, one of said rods being connected to said shifter member and the other to said piston element, and piston element stop means for limiting motion of said piston element in either direction, the relative spacing of said rod and piston element stop means being such that motion of said piston element in either direction causes compression of said spring means and engagement of said rod stop means before motion of said piston element is arrested by said piston element stop means, said spring being re-expansible after motion of said piston element is arrested to complete the initiated motion of said shifter member.

JOHN R. ALMOND.

References Cited in the file of this patent

UNITED STATES PATENTS

| Number | Name | Date |
|---|---|---|
| 1,304,955 | Fowler | May 27, 1919 |
| 1,487,832 | Barney | Mar. 25, 1924 |
| 1,552,886 | Shultz | Sept. 8, 1925 |
| 1,720,989 | Ahlm | July 16, 1929 |
| 1,870,341 | Maybach | Aug. 9, 1932 |
| 2,077,663 | Batten | Apr. 20, 1937 |
| 2,186,653 | Penote | Jan. 9, 1940 |
| 2,348,460 | Pennema et al. | May 9, 1944 |
| 2,356,598 | Lang et al. | Aug. 22, 1944 |
| 2,373,259 | Price | Apr. 10, 1945 |
| 2,402,343 | Price | June 18, 1946 |
| 2,605,749 | Buckendal | Aug. 5, 1952 |

FOREIGN PATENTS

| Number | Country | Date |
|---|---|---|
| 94,131 | Sweden | Jan. 13, 1939 |